US006527885B2

(12) United States Patent
Klug et al.

(10) Patent No.: US 6,527,885 B2
(45) Date of Patent: Mar. 4, 2003

(54) EXPLOSIVES COMPRISING MODIFIED COPOLYMERS OF POLYISOBUTYLENE, VINYL ESTERS AND MALEIC ANHYDRIDE AS EMULSIFIERS

(75) Inventors: Peter Klug, Grossostheim (DE); Ralf Bender, Oberursel (DE)

(73) Assignee: Clariant GmbH, Frankfurt (DE)

( * ) Notice: Subject to any disclaimer, the term of this patent is extended or adjusted under 35 U.S.C. 154(b) by 205 days.

(21) Appl. No.: 09/770,919

(22) Filed: Jan. 26, 2001

(65) Prior Publication Data

US 2002/0108687 A1 Aug. 15, 2002

(30) Foreign Application Priority Data

Jan. 27, 2000 (DE) ......................................... 100 03 297

(51) Int. Cl.[7] .............................................. C06B 45/00
(52) U.S. Cl. ................. 149/19.5; 149/19.91; 149/108.8
(58) Field of Search ............................ 149/19.5, 19.91, 149/46, 108.8

(56) References Cited

U.S. PATENT DOCUMENTS

| 3,447,978 A | | 6/1969 | Bluhm |
| 3,547,858 A | | 12/1970 | Worrall |
| 3,977,923 A | * | 8/1976 | Uelzmann ................... 149/19.1 |
| 4,736,683 A | * | 4/1988 | Bachman et al. ........... 102/290 |
| 4,822,433 A | | 4/1989 | Cooper et al. |
| 4,828,633 A | | 5/1989 | Forsberg |
| 4,931,110 A | | 6/1990 | McKenzie et al. |
| 4,999,062 A | | 3/1991 | Snare et al. |
| 5,439,981 A | | 8/1995 | Balzer |
| 5,747,619 A | | 5/1998 | Denzinger et al. |
| 5,920,031 A | | 7/1999 | Jahnke |
| 5,976,202 A | | 11/1999 | Rath et al. |

FOREIGN PATENT DOCUMENTS

| BE | 729419 | 9/1969 |
| DE | 42 41 948 | 6/1994 |
| DE | 43 28 817 | 3/1995 |
| DE | 198 47 868 | 4/2000 |
| EP | 0 155 800 | 9/1985 |
| EP | 0 285 608 | 10/1988 |
| EP | 0 330 375 | 8/1989 |
| EP | 0 155 800 | 9/1989 |
| EP | 0 331 306 | 9/1989 |
| EP | 0 561 600 | 9/1993 |
| EP | 0 693 509 | 1/1996 |
| EP | 0 831 104 | 3/1998 |
| EP | 0 994 087 | 4/2000 |
| WO | WO 90/03359 | 4/1990 |

OTHER PUBLICATIONS

German Office Action.
Oil Gas European Maganzine, vol. 22, Feb. 1996, pp. 38–40.
PCT Search Report.
Derwent Abstract of EP 0 994 087.
Derwent Abstract of BE 729419.

* cited by examiner

*Primary Examiner*—John Hardee
(74) *Attorney, Agent, or Firm*—Richard P. Silverman

(57) ABSTRACT

The invention provides an explosive composition comprising

A) an oxygen-donating constituent, which forms a disperse phase,
B) an organic constituent, which forms a dispersion phase, and
C) at least one emulsifier, wherein the emulsifier includes a copolymer comprising, in random or regular order, structural units derived from a) maleic anhydride,
b) one or more olefins having more than 40 carbon atoms, and
c) a vinyl ester of carboxylic acids having from 2 to 12 carbon atoms, where the structural units derived from maleic anhydride have been modified by reaction with alcohols, amino alcohols, ammonia or amines.

10 Claims, No Drawings

EXPLOSIVES COMPRISING MODIFIED COPOLYMERS OF POLYISOBUTYLENE, VINYL ESTERS AND MALEIC ANHYDRIDE AS EMULSIFIERS

BACKGROUND OF THE INVENTION

Of the explosives used worldwide today, the ammonium nitrate explosives are the largest group. They are widespread particularly in mining. A particularly important group within the ammonium nitrate explosives in this connection are the emulsion explosives, which consist essentially of a water- (or salt)-in-oil emulsion of an aqueous solution, supersaturated at room temperature, in an oil matrix (fuel). The oil phase is the continuous phase and includes small droplets of the supersaturated solution of the oxidizing agent. In this connection, the water content of the solution can be up to below 4% by weight. The dissolved salts are metastable and have a tendency toward crystallization. If, for example, ammonium nitrate crystals form, this has unfavorable effects on the emulsion (solidification, the emulsion is no longer pumpable) and also on the cap sensitivity of the emulsion, i.e. the explosive becomes less sensitive to initial detonation. In order to keep such an emulsion stable, therefore, an emulsifier is generally required which is suitable for the preparation of water-in-oil emulsions. Because of its surface activity, it promotes emulsification of the salt phase in small droplets and prevents coalescence of the formed droplets after the emulsion has formed.

The emulsion, also called matrix, is generally still not ignitable, and therefore, in order to achieve sufficient cap sensitivity, the density of the matrix must be lowered by adding microspheres (glass bubbles), by chemical gassing or by another method, such as, for example, by adding granular ammonium nitrate. The emulsions are then in some circumstances also ignitable without boosters with blasting caps. Such emulsions are safety explosives. This technology was described for the first time in U.S. Pat. No. 3,447,978.

U.S. Pat. No. 3,447,978 discloses explosive emulsions consisting of a salt-in-oil emulsion of a supersaturated ammonium nitrate solution in an oil matrix, an emulsifier of the water-in-oil type, e.g. a sorbitan ester, fatty acid glycerides or phosphoric esters, being used as emulsifiers. These emulsifiers, however, only give emulsions with low long-term stability.

EP-A-0 155 800 discloses emulsion explosive material mixtures which comprise emulsifiers, where at least one emulsifier is strongly lipophilic and an agent for altering the electrical conductivity of the emulsion, which essentially consists of a lipophilic and of a hydrophilic component, and in which the lipophilic constituent has a chain structure derived from a polymer of a monoolefin containing 3–6 carbon atoms. In particular, reaction products of poly (isobutenyl)succinic anhydride with amino alcohols, amines and sorbitol as emulsifiers are described.

EP-A-0 285 608 discloses water-in-oil emulsions, where the emulsifiers present are reaction products of a hydrocarbon-substituted carboxylic acid or a hydrocarbon-substituted anhydride (or an ester or amide derived therefrom) with ammonia or at least one amine, the hydrocarbon radical having on average 20–500 carbon atoms. Polymers containing two or more hydrocarbon radicals are not disclosed. Reaction products of poly(isobutenyl)succinic anhydrides with morpholine and amino alcohols are specifically described.

The emulsifiers cited in EP-A-0 155 800 and EP-A-0 285 608 and based on polyisobutenylsuccinic anhydride (i.e. the reaction product of a long-chain, branched olefin with maleic anhydride), produce, in contrast to the emulsifiers of the first generation cited in U.S. Pat. No. 3,447,978, emulsions with high long-term stability. The base emulsifiers, however, have the disadvantage that their synthesis, because of the underlying ene reaction, requires very high temperatures (180–230° C.) and relatively long reaction times, which leads to a high consumption of energy and correspondingly high preparation costs.

Polymers of polyisobutylene and maleic anhydride are also part of the prior art. WO-A-90/03359 discloses polymers of polyisobutylene and maleic anhydride which, after they have been functionalized using polyamines, can be used as additives in fuels and lubricating oils. EP-A-0 831 104 discloses terpolymers of polyisobutylene, ∀-olefins and maleic anhydride and also reaction products of these terpolymers with polyamines for analogous applications.

The unpublished German Patent Application 198 47 868 describes modified copolymers of polyisobutene and maleic anhydride and, where appropriate, allylpolyglycol ethers as emulsifiers. These products are extremely effective emulsifiers for emulsion explosives. In contrast to the compounds cited in EP-A-0 155 800 and EP-A-0 285 608, these compounds have two or more hydrophobic groups and two or more hydrophilic head groups on the polymer backbone. The parent polymeric anhydrides can be prepared at a significantly lower temperature (80–150° C.) and by free-radical copolymerization significantly more quickly than the alkenylsuccinic acid derivatives of the prior art, meaning that they have ecological and also economic advantages over the prior art. Despite having molecular weights which are significantly higher than those of polyisobutenylsuccinic acid derivatives, the products do not have increased viscosities, meaning that the products can be handled without problems despite the relatively high molecular weight. In this connection, the emulsifying action and emulsion stability of the products, particularly in mixtures with small amounts of coemulsifiers, correspond to at least the products cited in the prior art. However, some of these substances tend to form clouding in the product.

SUMMARY OF THE INVENTION

However, this clouding can, surprisingly, be avoided if copolymers of polyisobutene, maleic anhydride and vinyl esters of carboxylic acids having 2 to 12 carbon atoms are used. These emulsifiers have an emulsifying action which is comparable or better than that of the compounds listed in German patent application 198 47 868 and are prepared in the same way with a low expenditure of energy, but form clear and stable products.

DESCRIPTION OF THE PREFERRED EMBODIMENTS

The invention thus provides an explosive composition comprising
A) an oxygen-donating constituent, which forms a disperse phase,
B) an organic constituent, which forms a dispersion phase, and
C) at least one emulsifier,
wherein the emulsifier includes a copolymer comprising, in random or regular order, structural units derived from
   a) maleic anhydride,
   b) one or more olefins having more than 40 carbon atoms, and
   c) a vinyl ester of carboxylic acids having from 2 to 12 carbon atoms, where the structural units derived from maleic anhydride have been modified by reaction with alcohols, amino alcohols, ammonia or amines.

In the text below, the term "maleic anhydride" also refers to the maleic anhydride modified in the sense given above by reaction with alcohols, amino alcohols, ammonia or amines.

The emulsifier according to the invention comprises, in the copolymer chain, at least one olefin, preferably an α-olefin having more than 40, preferably from 40 to 500, in particular from 40 to 200, carbon atoms. The copolymer may also further comprise other comonomers.

Suitable olefins for the preparation of the polymers according to the invention are olefins preferably containing a double bond in the α-position or mixtures of the number of such olefins. Particular preference is given to olefins obtained by polymerization of $C_2$–$C_6$-monoolefins, such as, for example, polypropylenes or polyisobutylenes in the molecular weight range from, preferably, 200–5000 g/mol, and which comprise >30%, preferably >50%, particularly preferably >70%, of isomers containing a double bond in the α-position, i.e., for example, containing an end group R—C(=CH$_2$)CH$_3$. Such polyisobutylene grades are obtainable, for example, under the trade names Glissopal® or Ultravis®. In this connection, particularly suitable polyisobutylenes are those which have a high content of isomers containing an ∀-position double bond.

Suitable vinyl esters are vinyl esters of carboxylic acids having 2 to 12 carbon atoms, preferably having 4 to 12 carbon atoms, such as, for example, vinyl acetate, vinyl propionate, particularly preferably vinyl esters of carboxylic acids having 4 to 12 carbon atoms which have tertiary branching of the carbon chain, such as, in particular, neocarboxylic vinyl esters.

The vinyl esters of neocarboxylic acids present in the copolymer are derived from neocarboxylic acids of the formula

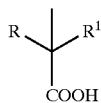

which have a total of 4 to 12 carbon atoms. R and $R^1$ are linear alkyl radicals. The neocarboxylic acids are preferably neononanoic, neodecanoic, neoundecanoic or neododecanoic acid.

The emulsifiers according to the invention can be synthesized by methods known per se, one description being, for example, in Oil Gas European Magazine 1996, 22, 38–40. Preferably mixtures of compounds having olefinic double bonds, preferably ∀-olefins, particularly preferably polyisobutylene and vinyl esters, with maleic anhydride are firstly polymerized using a suitable free-radical initiator. The molar quantity ratio between maleic anhydride and the total of the other monomers is preferably from 0.7:1 to 1.6:1. The polymerization can be carried out without a diluent, or else in a nonprotic solvent. The reaction temperature of the polymerization is between 50 and 200° C., preferably between 80 and 160° C. Alternating copolymers of olefin and maleic anhydride preferably form. In the second reaction step, the resulting polymer is reacted in a polymer-analogous reaction with alcohols or amino alcohols to give polymeric half-esters, with ammonia and/or amines and, where appropriate, also with amino alcohols, to give polymeric half-amides or imides.

Suitable alcohols for the functionalization of the maleic anhydride copolymers to give half-esters are monoalcohols having 1–6 carbon atoms, e.g. methanol, ethanol, propanols, butanols or pentanols; alkylpolyglycols are also suitable.

Suitable amino alcohols are, for example, N,N-dimethylaminoethanol, N,N-diethylaminoethanol, N,N-dibutylaminoethanol, 3-dimethylaminopropanol, N-hydroxyethylmorpholine, monoethanolamine, diethanolamine, triethanolamine, 3-aminopropanol, isopropanolamine and 2-(2-aminoethoxy)ethanol. The half-ester formation is carried out at 30 to 150° C., preferably at 50 to 100° C. In order to avoid crosslinking reactions, amino alcohols with a tertiary amine nitrogen and a hydroxyl function, such as dimethylaminoethanol, diethylaminoethanol or N-hydroxyethyl-morpholine, are particularly preferred.

Suitable amines for the functionalization of the maleic anhydride copolymers are monoamines with a primary or secondary amino function, such as methylamine, ethylamine, butylamine, laurylamine, coconut fatty amine, stearylamine, dimethylamine, diethylamine, dibutylamine etc., but also di- and polyamines, e.g. 3-dimethylaminopropylamine, 3-diethylaminopropylamine or 3-morpholinopropylamine.

Preferred amines contain only one condensable alcohol or amino group in order to prevent undesired crosslinking of the individual polymer units. Using the amines listed, olefin/MA copolymers (MA=maleic anhydride) functionalized to the half-amide are obtained at reaction temperatures of at most 50–60° C. Above 50° C., imide formation arises to an increased extent, meaning that, should olefin/MA copolymers functionalized to the imide be desired, it is preferable to carry out the reaction in the temperature range from about 50 to about 150° C.

The reactions to give the half-esters, half-amides and imides can be carried out either without a diluent, or else in a solvent, preferably in the mineral oil used for formation of the explosive emulsion. The latter is particularly preferred, in cases where the viscosity of the emulsifier permits it.

The emulsifiers according to the invention can be mixed with any common emulsifier. Preferred mixing components are the water-in-oil emulsifiers used in U.S. Pat. No. 3,447,978, such as sorbitan monooleate, glycerides, phosphoric esters, etc., but also amidoamines/imidazolines obtainable by condensation of fatty acids with polyamines. Particular preference is given to mixtures of the emulsifiers according to the invention with the monomeric emulsifiers specified in EP-A-0 155 800 and EP-A-0 285 608, i.e. with derivatives of alkenylsuccinic anhydrides, such as polyisobutenylsuccinic anhydride, i.e. half-esters, half-amides, imides and salts thereof with amines and alkali metals.

The emulsifiers according to the invention are suitable for use as constituent C in the explosive compositions (emulsion explosives) of the invention.

The salt phase of the emulsion explosive (constituent A) consists of a supersaturated solution of an oxygen-releasing salt, ammonium nitrate preferably being used. Other oxygen-releasing salts, e.g. other nitrates such as sodium or potassium nitrate, and also perchlorates can also be used as additives.

The oil phase (constituent B) used is generally a mineral oil, in particular a paraffin mineral oil. It is also possible to use naphthene-based oils, vegetable oils, used oil or diesel oil. The emulsifiers used are mostly predissolved in the oil phase. The emulsifiers can be used as concentrate (up to 100% of active substance) or else as solution in a suitable oil, in cases where the inherent viscosity of the emulsifier is too high.

Further auxiliaries are bodying agents such as waxes, paraffins or elastomers, in cases where the intention is to prepare cartridged explosive, products which are said to increase the water resistance of the emulsion, such as silicone oils, but also other emulsion stabilizers, thickeners or antioxidants, which are intended to prevent aging of the emulsifier.

The explosive emulsion generally comprises 20–97% by weight, preferably 30–95% by weight, particularly preferably 70–95% by weight, of the discontinuous phase (i.e. predominantly water and ammonium nitrate with the other water-soluble additives), and the water content varies in the range 2–30%, preferably in the range 4–20%. The oil phase (including the additives dissolved therein) includes about 1–20% by weight of the overall composition, but preferably 1–10%. The content of emulsifier in the overall composition is in the range 0.2–5% by weight, preferably in the range 0.4–3%.

The explosive emulsions are preferably prepared using common emulsifying processes. Firstly, a supersaturated ammonium nitrate solution (optionally with the addition of other water-soluble auxiliaries listed above) at 80–100° C. is prepared and heated until all solids are dissolved, and, if necessary, the solution is filtered to remove insoluble material. In parallel, a solution of the emulsifier in the oil matrix (likewise with the addition of other oil-soluble auxiliaries such as waxes, paraffins, antioxidants, consistency regulators etc.), likewise at 50–100° C., is prepared. Then, with stirring, the salt melt is preferably added to the oil/emulsifier mixture, but the reverse procedure is also possible. Vigorous stirring increases emulsion formation. The entrainment of seed crystals into the emulsion must be avoided. Where appropriate, other components, such as microballoons (glass bubbles), solids such as TNT, solid fuels such as aluminum or sulfur, inert materials such as baryte or sodium chloride, or undissolved ammonium nitrate are then added, and the mixture is stirred until the solids are distributed homogeneously. Chemical gassing involves adding, for example, thiourea and sodium nitrite, which leads to gassing of the emulsion within a certain period. In industry, the emulsification stage can be carried out in special mixers and, where appropriate, using static mixers.

The invention further provides a terpolymer comprising monomer units derived from
A) an olefin having more than 40 carbon atoms,
B) maleic anhydride, and
C) a vinyl ester of carboxylic acids having from 2 to 12 carbon atoms.

The olefin preferably has from 40 to 500, in particular from 40 to 200, carbon atoms. It is preferably an α-olefin, particularly preferably a polyisobutene. A particularly preferred embodiment relates to modified terpolymers obtained by polymer-analogous reaction of the said terpolymers with alcohols, amines and amino alcohols. The terpolymers according to the invention are used as emulsifiers in explosive compositions.

Particularly preferred terpolymers comprise monomer units of
A) 18 to 70 mol % of polyisobutene
B) 25 to 80 mol % of maleic anhydride
C) 2 to 20 mol % of vinyl ester.

As the experimental examples listed below demonstrate, the polymeric emulsifiers according to the invention, alone or in particular in a mixture with other emulsifiers, such as, for example, customary polyisobutenylsuccinic half-esters, exhibit identical emulsion stabilities to a conventional polyisobutenylsuccinic acid derivative.

EXAMPLES

Synthesis of the Polymeric Emulsifier

Example 1

Copolymer of Maleic Anhydride, Vinyl Neodecanoate (VEOVA 10) and Polyisobutylene A 2 l four-necked flask fitted with a stirrer was charged with 800 g (0.80 mol) of a polyisobutylene with a high α-olefin content and a molecular weight of 1000 g/mol (Glissopal® 1000, BASF), 39.6 g (0.20 mol) of VEOVA 10, 147.1 g (1.50 mol) of maleic anhydride and 707 g of xylene, and the mixture was heated to 80° C. The system was then evacuated 3× up to 100 mbar and aerated in each case with nitrogen in order to render it inert. At 80° C., 9.9 g (1% by weight) of tert-butyl perbenzoate were added. The reaction mixture was then stirred at 80° C. for 30 hours. A distillation bridge was then attached and firstly xylene was removed, and then, at a maximum of 200° C./20 mbar, excess maleic anhydride was removed. Cooling gave 952 g of a red-brown clear oil.

Molecular weight (GPC): Mn=1480 g/mol, Mw=4896 g/mol

Example 2

Copolymer of Maleic Anhydride, Vinyl Neodecanoate (VEOVA 10) and Polyisobutylene A 2 l four-necked flask fitted with a stirrer was charged with 810 g (0.81 mol) of a polyisobutylene with a high α-olefin content and a molecular weight of 1000 g/mol (Glissopal® 1000, BASF), 17.8 g (0.09 mol) of VEOVA 10,132.3 g (1.35 mol) of maleic anhydride and 700 g of xylene, and the mixture was heated to 80° C. The system was then evacuated 3× up to 100 mbar and aerated in each case with nitrogen in order to render it inert. At 80° C., 9.6 g (1% by weight) of tert-butyl perbenzoate were added. The reaction mixture was then stirred at 80° C. for 30 hours. A distillation bridge was then attached and firstly xylene was removed, and then, at a maximum of 200° C./20 mbar, excess maleic anhydride was removed. Cooling gave 928 g of a red-brown clear oil.
Molecular weight (GPC): Mn=1405 g/mol, Mw=4282 g/mol
MA equivalent: 909.6 g/mol Example 3

Copolymer of Maleic Anhydride, Vinyl Neodecanoate (VEOVA 10) and Polyisobutylene A 2 l four-necked flask fitted with a stirrer was charged with 950 g (0.95 mol) of a polyisobutylene with a high α-olefin content and a molecular weight of 1000 g/mol (Glissopal® 1000, BASF), 9.9 g (0.05 mol) of VEOVA 10, 147.1 g (1.50 mol) of maleic anhydride and 580 g of xylene, and the mixture was heated to 80° C. The system was then evacuated 3× up to 100 mbar and aerated in each case with nitrogen in order to render it inert. At 80° C., 11.1 g (1% by weight) of tert-butyl perbenzoate were added. The reaction mixture was then stirred at 80° C. for 30 hours. A distillation bridge was then attached and firstly xylene was removed, and then, at a maximum of 200° C./20 mbar, excess maleic anhydride was removed. Cooling gave 1077 g of a red-brown clear oil.
Molecular weight (GPC): Mn=1423 g/mol, Mw=4857 g/mol
MA equivalent: 823 g/mol

Example 4

Reaction of Example 1 with diethylaminoethanol

A 1 l four-necked flask fitted with a stirrer was charged with 101 g of a paraffinic mineral oil and 207 g (0.25 mol) of the copolymer from Example 1; the mixture was heated to 90° C. under a nitrogen atmosphere. Over the course of 10 min, 29.3 g (0.25 mol) of N,N-diethylethanolamine were added dropwise, and the mixture was stirred for 5 hours at 100° C. 3.4 g of Celite were added, and the mixture was homogenized and filtered through a pressure filter at 100° C. This gave 271 g of a red-brown oil with an acid number of 28.0 mg of KOH/g and 0.91% of basic nitrogen.

Example 5

Reaction of Example 2 with Diethylaminoethanol

A 1 l four-necked flask fitted with a stirrer was charged with 110 g of a paraffinic mineral oil and 227 g (0.25 mol) of the copolymer from Example 2, and the mixture was heated to 90° C. under a nitrogen atmosphere. Over the course of 10 min, 29.3 g (0.25 mol) of N,N-diethylethanolamine were added dropwise, and the mixture was stirred for 5 hours at 100° C. 3.7 g of Celite were added, and the mixture was homogenized and filtered through a pressure filter at 100° C. This gave 299 g of a red-brown oil with an acid number of 25.5 mg of KOH/g and 0.86% of basic nitrogen.

Example 6

Reaction of Example 3 with Diethylaminoethanol

A 1 l four-necked flask fitted with a stirrer was charged with 101 g of a paraffinic mineral oil and 206 g (0.25 mol) of the copolymer from Example 3, and the mixture was heated to 90° C. under a nitrogen atmosphere. Over the course of 10 min, 29.3 g (0.25 mol) of N,N-diethylethanolamine were added dropwise, and the mixture was stirred at 100° C. for 5 hours. 3.4 g of Celite were added, and the mixture was homogenized and filtered through a pressure filter at 100° C. This gave 320 g of a red-brown oil with an acid number of 22.3 mg of KOH/g and 0.97% of basic nitrogen.

Example 7

Comparative Example

This emulsifier was obtained by reacting a polyisobutyenylsuccinic anhydride (molecular weight of the parent polyisobutene: 950 g/mol) with one mole equivalent of 2-diethylaminoethanol at 90° C.

Example 8

The emulsifier of Example 4 was mixed in the mass ratio 50:50 (taking into consideration the active substance content) with the comparative emulsifier of Example 7 and homogenized at 60° C.

Example 9

The emulsifier of Example 5 was mixed in the mass ratio 50:50 (taking into consideration the active substance content) with the comparative emulsifier of Example 7 and homogenized at 60° C.

Example 10

The emulsifier of Example 6 was mixed in the mass ratio 50:50 (taking into consideration the active substance content) with the comparative emulsifier of Example 7 and homogenized at 60° C.

Determination of the Molecular Weights of the Base Polymers (Examples 1–3):

The molecular weights were determined by gel permeation chromatography (GPC) using tetrahydrofuran as eluent against polyisobutene as standard; the values given were for Mn and Mw. The molecular weight determinations include the unreacted polyisobutene present in the polymeric anhydride. The actual molecular weights of the polymeric anhydride are accordingly considerably higher.

Preparation of the Test Emulsion

The test emulsion used has the following composition:
1.0 g of emulsifier (100% of active substance not taking into consideration the oil content)
6.3 g of white oil
81.0 g of ammonium nitrate
12.0 g of water The white oil together with the emulsifier is introduced at 80° C. into a tall 250 ml beaker and, with stirring using a stainless steel anchor stirrer which passes close to the wall and with an increasing stirring rate from 800 to 2000 rpm, the clear, hot ammonium nitrate/water melt at a temperature of from 95 to 98° C. is introduced. The melt is initially added dropwise and then added in one portion over 15 seconds from a narrow-necked 100 ml Erlenmeyer flask such that it can be stirred in the center of the stirrer blade; the melt must not solidify on the wall. The resulting, transparent emulsion is then stirred at 80° C. for from 3 to 5 min and drawn off while still hot (without any crystals which may have formed).

Emulsion Stability

The shelf life of the prepared emulsions was investigated a) at room temperature (about 20–25° C.) and also b) during storage at fluctuating temperatures (alternating in each case for 24 h at 0° C. and 40° C.). The assessment was visual; the emulsion was no longer regarded as stable if seed crystals had visibly formed.

| Emulsifier | Storage stability at RT (d) | Storage stability at fluctuating temperatures (d) | Polymer component | Additive | Mixing ratio |
|---|---|---|---|---|---|
| Example 4 | >60 | 12 | | | |
| Example 5 | >60 | >60 | | | |
| Example 6 | >60 | 12 | | | |
| Example 7 (Comp.) | >30 | >60 | | | |
| Example 8 | >60 | >60 | Example 4 | Example 7 | 50:50 |

-continued

| Emulsifier | Storage stability at RT (d) | Storage stability at fluctuating temperatures (d) | Polymer component | Additive | Mixing ratio |
|---|---|---|---|---|---|
| Example 9 | >60 | >60 | Example 5 | Example 7 | 50:50 |
| Example 10 | >60 | >60 | Example 6 | Example 7 | 50:50 |

What is claimed is:

1. An explosive composition comprising
   A) an oxygen-donating constituent, which forms a disperse phase,
   B) an organic constituent, which forms a dispersion phase, and
   C) at least one emulsifier,
   wherein the emulsifier includes a copolymer comprising, in random or regular order, structural units derived from
   a) maleic anhydride,
   b) one or more olefins having more than 40 carbon atoms, and
   c) a vinyl ester of carboxylic acids having from 2 to 12 carbon atoms,
   where the structural units derived from maleic anhydride have been modified by reaction with alcohols, amino alcohols, ammonia or amines.

2. An explosive composition as claimed in claim 1, wherein the composition comprises an alternating copolymer of a vinyl ester of carboxylic acids having from 2 to 12 carbon atoms, at least one olefin having ca. 40–500 carbon atoms and maleic anhhydride which has been modified with a) alcohols, b) amino alcohols, c) ammonia or d) amines.

3. An explosive composition as claimed in claim 1 wherein the olefin is a polymer of short-chain olefins having 2–6 carbon atoms.

4. An explosive composition as claimed in claim 3, wherein the short-chain olefin is butene or a butene isomer.

5. An explosive composition as claimed in claim 1, wherein the olefin used is polyisobutylene.

6. An explosive composition as claimed in claim 1, wherein a $C_8$–$C_{12}$-vinyl ester is used as constituent c) of the emulsifier copolymer.

7. An explosive composition as claimed in claim 1, wherein the polymer of maleic anhydride, vinyl esters and olefins is reacted with an amino alcohol to give the half-ester or a salt of the half-ester.

8. An explosive composition as claimed in claim 7, wherein the amino alcohol is 2-dimethylaminoethanol or 2-diethylaminoethanol.

9. An explosive composition as claimed in claim 1, wherein the coemulsifier used is a derivative of an alkenylsuccinic anhydride.

10. An explosive composition as claimed in claim 9, wherein the derivative of an alkenylsuccinic anhydride is a derivative of a polyisobutenylsuccinic anhydride.

* * * * *